US011836905B2

(12) United States Patent
Moustafa et al.

(10) Patent No.: US 11,836,905 B2
(45) Date of Patent: Dec. 5, 2023

(54) IMAGE REENACTMENT WITH ILLUMINATION DISENTANGLEMENT

(71) Applicant: Spree3D Corporation, Incline Village, NV (US)

(72) Inventors: Mohamed N. Moustafa, Metuchen, NJ (US); Ahmed A. Ewais, New Cairo (EG); Amr A. Ali, Cairo (EG)

(73) Assignee: Spree3D Corporation, Incline Village, NV (US)

( * ) Notice: Subject to any disclaimer, the term of this patent is extended or adjusted under 35 U.S.C. 154(b) by 183 days.

(21) Appl. No.: 17/338,196

(22) Filed: Jun. 3, 2021

(65) Prior Publication Data

US 2022/0392034 A1    Dec. 8, 2022

(51) Int. Cl.
*G06T 5/50*        (2006.01)
*G06T 7/70*        (2017.01)
(Continued)

(52) U.S. Cl.
CPC .............. *G06T 5/50* (2013.01); *G06N 3/045* (2023.01); *G06N 3/088* (2013.01); *G06T 7/70* (2017.01);
(Continued)

(58) Field of Classification Search
CPC ... G06T 5/50; G06T 7/70; G06T 2207/10016; G06T 2207/20081; G06T 2207/20221;
(Continued)

(56) References Cited

U.S. PATENT DOCUMENTS 6,466,215 B1    10/2002  Matsuda et al.
6,546,309 B1     4/2003  Gazzuolo
(Continued)

FOREIGN PATENT DOCUMENTS

CN      110930500 A      3/2020
WO    2014161429 A1    10/2014
(Continued)

OTHER PUBLICATIONS

Goes, F. et al., "Garment Refitting for Digital Characters", SIGGRAPH '20 Talks, Aug. 17, 2020, Virtual Event, USA; 2 pages. ACM ISBN 978-1-4503-7971-7/20/08. https://doi.org/10.1145/3388767.3407348.

(Continued)

*Primary Examiner* — Terrell M Robinson
(74) *Attorney, Agent, or Firm* — Edward J. Radlo; RADLO & SU

(57) ABSTRACT

Apparati, methods, and computer readable media for inserting identity information from a source image (1) into a destination image (2), while mimicking illumination of the destination image (2). In an apparatus embodiment, an identity encoder (4) is configured to encode just identity information of the source image (1) and to produce an identity vector (7), where the identity encoder (4) does not encode any pose information or illumination information of the source image (1). A driver encoder (12) has two components: a pose encoder (5) configured to encode pose information of the destination image (2) and an illumination encoder (6) configured to separately encode illumination information of the destination image (2), and to produce two vectors: a pose vector (8) and an illumination vector (9). A neural network generator (10) is coupled to the identity encoder (4) and to the driver encoder (12), and has three inputs: the identity vector (7), the pose vector (8), and the illumination vector (9). The neural network generator (10) is configured to generate, in response to these three inputs, a composite image (3) comprising identity information of the source image (1) inserted into the destination image (2), wherein the composite image has substantially the same illumination as the destination image.

22 Claims, 7 Drawing Sheets

(51) Int. Cl.
   *G06N 3/088* (2023.01)
   *G06N 3/045* (2023.01)

(52) U.S. Cl.
   CPC ............ *G06T 2207/10016* (2013.01); *G06T 2207/20081* (2013.01); *G06T 2207/20084* (2013.01); *G06T 2207/20221* (2013.01); *G06T 2207/30201* (2013.01)

(58) Field of Classification Search
   CPC .......... G06T 2207/30201; G06N 3/045; G06N 3/088
   See application file for complete search history.

(56) References Cited

U.S. PATENT DOCUMENTS

| | | | |
|---|---|---|---|
| 6,731,287 | B1 | 5/2004 | Erdem |
| 10,255,681 | B2 | 4/2019 | Price et al. |
| 10,936,853 | B1 | 3/2021 | Sethi et al. |
| 2007/0091085 | A1* | 4/2007 | Wang .................. G06T 7/55 345/420 |
| 2007/0188502 | A1 | 8/2007 | Bishop |
| 2009/0066700 | A1 | 3/2009 | Harding et al. |
| 2010/0284577 | A1* | 11/2010 | Hua .................. G06V 10/50 382/118 |
| 2012/0032960 | A1* | 2/2012 | Kameyama .... H04N 21/440281 345/428 |
| 2013/0100140 | A1 | 4/2013 | Ye et al. |
| 2013/0314412 | A1 | 11/2013 | Gravois et al. |
| 2014/0198108 | A1 | 7/2014 | Sigal et al. |
| 2015/0139485 | A1 | 5/2015 | Bourdev |
| 2016/0163084 | A1* | 6/2016 | Corazza ............... G06V 40/161 345/419 |
| 2016/0247017 | A1 | 8/2016 | Sareen et al. |
| 2016/0284018 | A1 | 9/2016 | Adeyoola et al. |
| 2017/0004657 | A1 | 1/2017 | Zagel et al. |
| 2017/0080346 | A1 | 3/2017 | Abbas |
| 2018/0047200 | A1 | 2/2018 | O'Hara et al. |
| 2018/0197347 | A1 | 7/2018 | Tomizuka |
| 2018/0240280 | A1 | 8/2018 | Chen et al. |
| 2018/0240281 | A1 | 8/2018 | Vincelette |
| 2019/0287301 | A1 | 9/2019 | Colbert |
| 2019/0371032 | A1 | 12/2019 | Scapel et al. |
| 2020/0126316 | A1 | 4/2020 | Sharma et al. |
| 2020/0234508 | A1 | 7/2020 | Shaburov et al. |
| 2020/0258280 | A1 | 8/2020 | Park et al. |
| 2020/0294294 | A1 | 9/2020 | Petriv et al. |
| 2020/0306640 | A1 | 10/2020 | Kolen et al. |
| 2020/0320769 | A1 | 10/2020 | Chen et al. |
| 2020/0334867 | A1 | 10/2020 | Chen et al. |
| 2020/0346420 | A1 | 11/2020 | Friedrich |
| 2020/0364533 | A1 | 11/2020 | Sareen et al. |
| 2020/0402307 | A1 | 12/2020 | Tanwer et al. |
| 2021/0049811 | A1 | 2/2021 | Fedyukov et al. |
| 2021/0150187 | A1 | 5/2021 | Karras et al. |
| 2021/0150197 | A1 | 5/2021 | Kokkinos et al. |
| 2021/0303919 | A1 | 9/2021 | Niu |
| 2022/0171458 | A1* | 6/2022 | Lemley .................. G06F 18/21 |

FOREIGN PATENT DOCUMENTS

| | | | |
|---|---|---|---|
| WO | 2017143392 | A1 | 8/2017 |
| WO | 2018089039 | A1 | 5/2018 |
| WO | 2018154331 | A1 | 8/2018 |
| WO | 2019050808 | A1 | 3/2019 |
| WO | 2019164266 | A1 | 8/2019 |
| WO | 2020038254 | A1 | 2/2020 |

OTHER PUBLICATIONS

Kim et al., "Deep Video Portraits", ACM Trans. Graph, vol. 37, No. 4, Article 163; published online May 29, 2018, pp. 163:1-14; Association for Computing Machinery, U.S.A. https://arxiv.org/pdf/1805.11714.pdf.

Lewis et al., "Pose Space Deformation: A Unified Approach to Shape Interpolation and Skeleton-Driven Deformation", SIGGRAPH 2000, New Orleans, Louisiana, USA, pp. 165-172.

Neophytou et al., "Shape and Pose Space Deformation for Subject Specific Animation", Centre for Vision Speech and Signal Processing (CVSSP), University of Surrey, Guildford, United Kingdom; IEEE Conference Publication, IEEE Xplore, 2013, 8 pages.

"Pose space deformation," article in Wikipedia, downloaded Jul. 29, 2022, 2 pages.

Wawrzonowski et al. "Mobile devices' GPUs in cloth dynamics simulation", Proceedings of the Federated Conference on Computer Science and Information Systems, Prague, Czech Republic, 2017, pp. 1283-1290. Retrieved on Feb. 23, 2022. Retrieved from UKL: https://annals-csis.orgVolume_11/drp/pdf/191.pdf.

Burkov, "Neural Head Reenactment with Latent Pose Descriptors", Procedings of the IEEE/CVF Conference on Computer Vision and Pattern Recognition (CVPR) 2020, pp. 13766-13795; Oct. 30, 2020. https://arxiv.org/pdf/2004.12000.

Deng, "Disentangled and Controllable Face Image Generation via 3D Imitative-Contrastive Learning", Computer Vision Foundation Conference, Procedings of the IEEE/CVF Conference on Computer Vision and Pattern Recognition (CVPR) 2020, pp. 5154-5163; open access version. https://arxiv.org/abs/1904.01909.

Tripathy, "ICface: Interpretable and Controllable Face Reenactment Using GANs", Procedings of the IEEE/CVF Winter Conference on Applications of Computer Vision (WACV) 2020, pp. 3385-3394; Jan. 17, 2020. https://arxiv.org/abs/1904.01909.

Huang, "Learning Identity-Invariant Motion Representations for Cross-ID Face Reenactment", Procedings of the IEEE/CVF Conference on Computer Vision and Pattern Recognition (CVPR) 2020, pp. 7084-7092, 2020, open access version, https://openaccess.thecvf.com/content_CVPR_2020/html/Huang_Learning_Identity-Invariant_Motion_Representations_for_Cross-ID_Face_Reenactment_CVPR_2020_paper.html.

Thies, "Face2Face: Real-Time Face Capture and Reenactment of RGB Videos", Jul. 29, 2020; abstract of this paper published in 2016 by IEEE at https://ieeexplore.ieee.org/document/7780631.

Zhao, "Joint face alignment and segmentation via deep multi-task learning", published in Multimedia Tools and Applications 78, 13131-13148 (2019), published by Springer Nature, 1 New York Plaza, Suite 4600, New York, NY 10004-1562, U.S.A., Jan. 12, 2018 https://doi.org/10.1007/s11042-018-5609-1.

Li, "FaceShifter: Towards High Fidelity and Occlusion Aware Face Swapping", Peking University and Microsoft Research, Sep. 15, 2020. lililngzhi@pku.edu.cn and jianbao.haya.doch.fangwen@microsoft.com; pdf version available at: https://arxiv.org/pdf/1912.13457.pdf.

Nirkin, "FSGAN: Subject Agnostic Face Swapping and Reenactment", Computer Vision Foundation, ICCV 2019, open access version, Aug. 2019, https://arxiv.org/pdf/1908.05932.pdf ; also published in Proceedings of the IEEE International Conference on Computer Vision, pp. 7184-7193 and on Yuval Nirkin's website: https://nirkin.com/fsgan/.

Naruniec, "High-Resolution Neural Face Swapping for Visual Effects", Eurographics Symposium on Rendering 2020, vol. 39 (2020), No. 4. https://studios.disneyresearch.com/wp-content/uploads/2020/06/High-Resolution-Neural-Face-Swapping-for-Visual-Effects.pdf; also published by the , Eurographics Association, c/o Fiduciare A. Richard SA, Avenue de Frontenex 32, 1207 Geeve, Switzerland, IDE CHE-100.558.3722020 https://diglib.eg.org/andle/10.2312/2632924.

\* cited by examiner

IMAGE REENACTMENT WITH ILLUMINATION DISENTANGLEMENT

INCORPORATION BY REFERENCE

The present patent application hereby incorporates by reference in its entirety the contents of commonly owned U.S. patent application Ser. No. 17/231,325 filed Apr. 15, 2021, entitled "Automatic Creation of a Photorealistic Customized Animated Garmented Avatar".

TECHNICAL FIELD

The present invention pertains to the field of compensating for illumination discrepancies when a first (static or video) image is inserted into a second (static or video) image.

BACKGROUND ART

Prior art practitioners have attempted, with varying degrees of success, to insert static or video images from a source image into a destination image. A consistent stumbling block of these prior practitioners has been adequate control of illumination. Mismatches between the illumination of the source image and illumination of the destination image have been all too common. This is particularly noticeable when the images in question are video images, because in those, the illumination of the destination image often varies considerably as a function of time as the video is rendered. The present invention overcomes these deficiencies of the prior art in an elegant manner. The output composite images produced by this invention take illumination into account, and are significantly more realistic than output images produced by prior art practitioners.

DISCLOSURE OF INVENTION

The present invention comprises apparati, methods, and computer readable media for inserting identity information from a source image (1) into a destination image (2), while mimicking illumination of the destination image (2). In an apparatus embodiment, an identity encoder (4) is configured to encode just identity information of the source image (1) and to produce an identity vector (7), where the identity encoder (4) does not encode any pose information or illumination information of the source image (1). A driver encoder (12) has two components: a pose encoder (5) configured to encode pose information of the destination image (2) and an illumination encoder (6) configured to separately encode illumination information of the destination image (2), and to produce two vectors: a pose vector (8) and an illumination vector (9). A neural network generator (10) is coupled to the identity encoder (4) and to the driver encoder (12), and has three inputs: the identity vector (7), the pose vector (8), and the illumination vector (9). The neural network generator (10) is configured to generate, in response to these three inputs, a composite image (3) comprising identity information of the source image (1) inserted into the destination image (2), wherein the composite image has substantially the same illumination as the destination image.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense; rather, the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
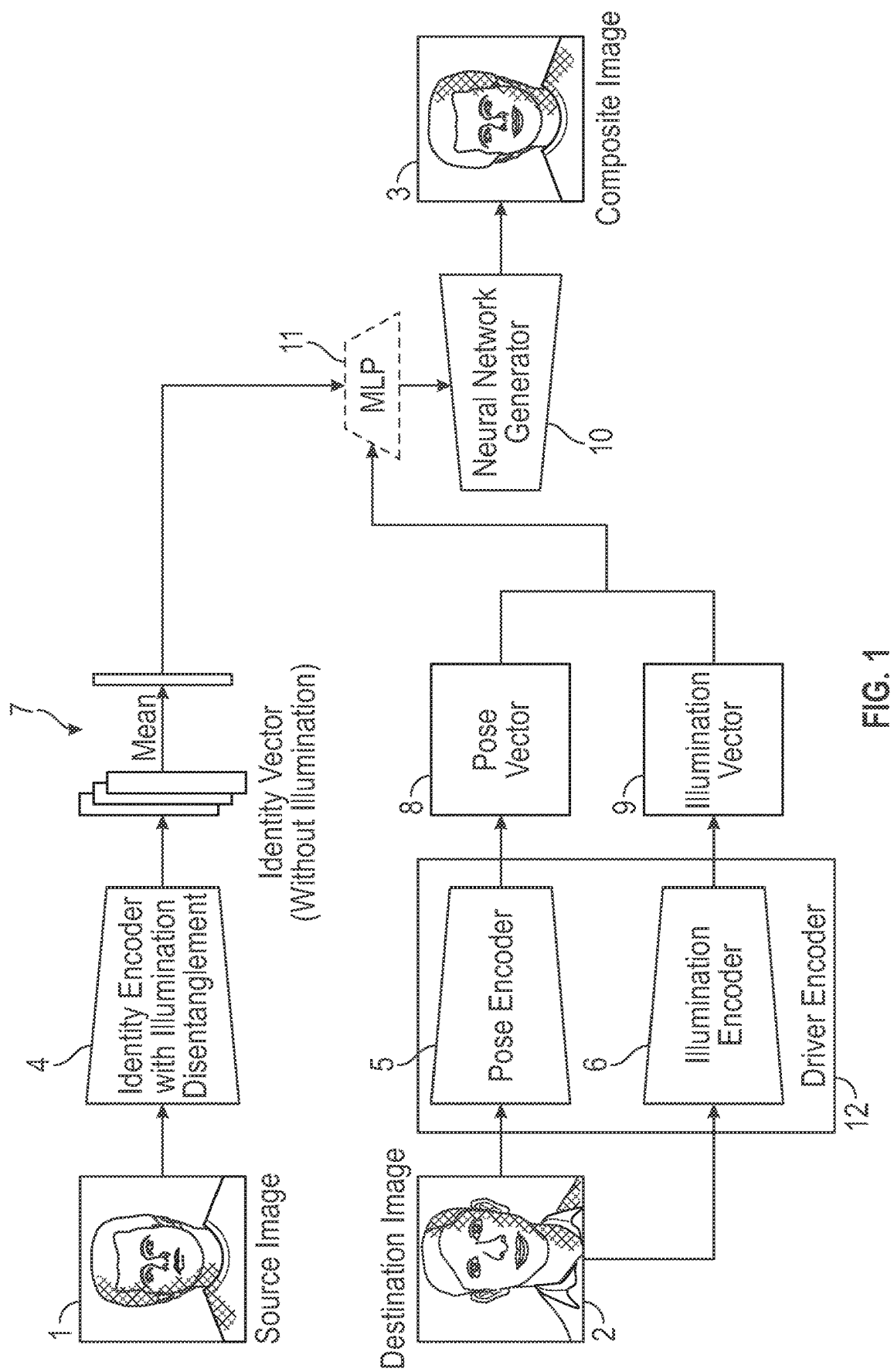
FIG. 1 is a block diagram of a first embodiment of the present invention.
Figure 2:
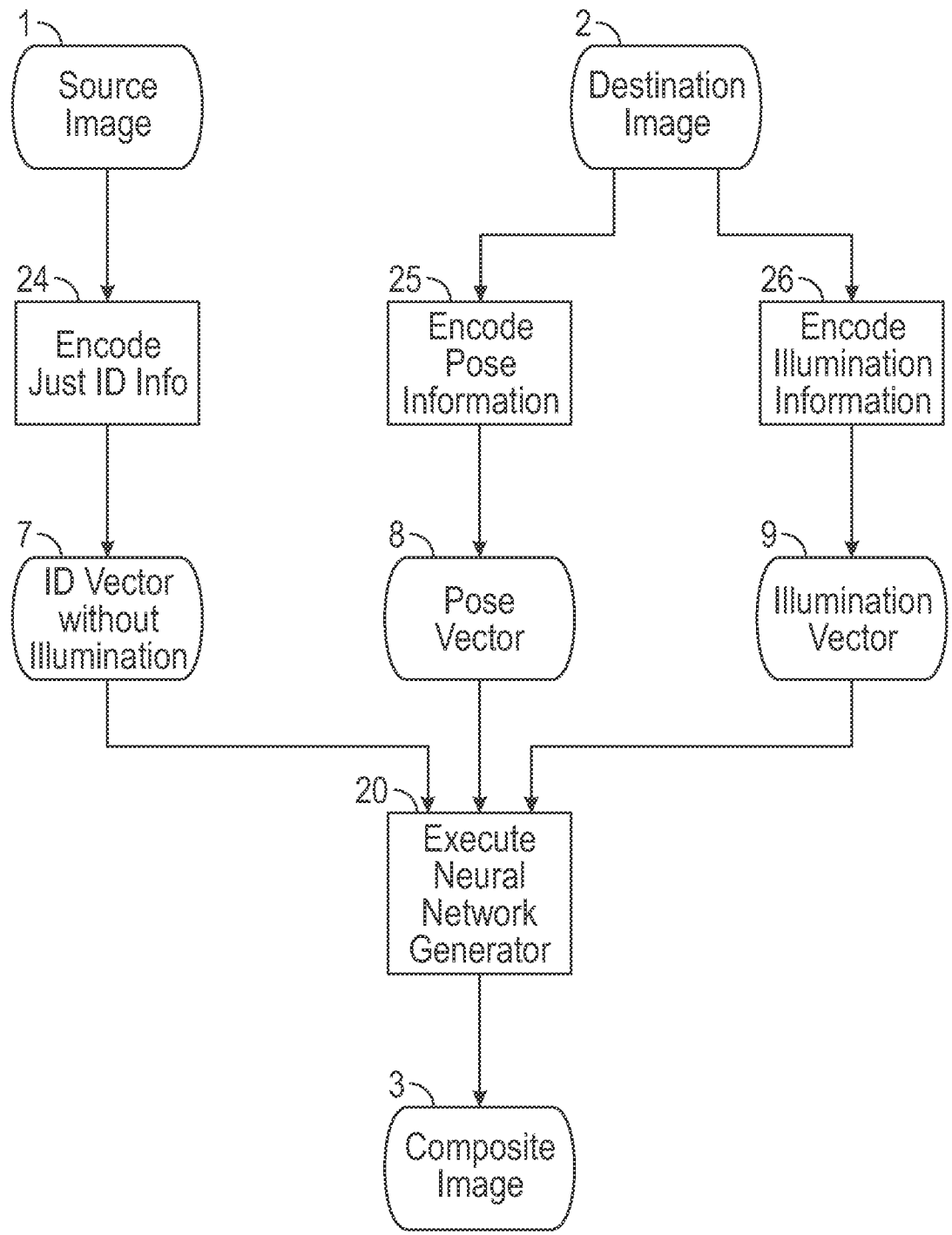
FIG. 2 is a flow diagram illustrating a method for implementing the FIG. 1 embodiment.

FIGS. 1 and 2 illustrate a first embodiment of the present invention. A user of the invention desires to insert a source image 1 into a destination image 2, while mimicking the illumination of the destination image 2. In the Figures, illumination is suggested by means of cross-hatching of items 1, 2, 3, 32, and 33. Source image 1 may be a static image or a video image, and typically comprises an image of the face and hair of a human or other animal. But the invention is not limited to those categories of sources; the invention can be used to insert features of an image 1 of an inanimate object into an image 2 of a different inanimate object. For example, the invention can be used to insert the make and/or model of an image 1 of a car or airplane into an image 2 of a different car or airplane, while reproducing the pose and illumination of the second image 2. Image 1 can depict the gait and/or torso of the source when the source is an animal. FIG. 1 illustrates source image 1 as a series of frames, suggesting multiple frames 1 of a video image or multiple static images 1 of the same source.

Destination (driver) image 2 can similarly be a static image or a video image, and is typically but not necessarily an image of a human, but not the same human depicted in source image 1. Destination image 2 typically comprises more than just the face and hair of the person depicted. For example, destination image 2 may comprise the upper torso of the person depicted in a certain pose. In the case where destination image 2 is a video, the gait, pose, and illumination of the destination image 2 normally changes as a function of time. In the case where video image 2 depicts a person adorned with a garment, the depiction of the garment normally varies as a function of time. For example, if the garment is a loosely fitting dress, and image 2 is a video image of a dancer twirling on a dance floor, the dress will appear to billow and collapse continuously (if the sampling rate is high enough) as a function of time. The garment may be made of any suitable material, such as cloth, vinyl, metal, string, Mylar, fruit, candy, etc.

Referring back to FIG. 1, identity encoder 4 is configured to encode just the identity information of source image 1, and does not encode any pose information or illumination information of image 1. Thus, encoder 4 is said to encode with "illumination disentanglement". Encoder 4 is typically a neural network. As such, encoder 4 has an associated loss function, which is minimized in a training phase. The output of encoder 4 is an identity vector 7 that does not contain illumination information pertaining to image 1. Vector 7 may be a series of vectors in the case where image 1 is a video, with one vector corresponding to each frame of the video. Similarly, vector 7 may be a series of vectors where image 1 comprises multiple static images of the source. In the case where image 1 is a single static image, vector 7 is a single vector. FIG. 1 illustrates an embodiment of the present invention in which the output of encoder 4 is a set of three vectors 7 representing, e.g., a video having just three frames or three images of the source. FIG. 1 symbolically illustrates that the invention typically takes the mean value of each component (dimension) of the three vectors and, in response thereto, generates a single vector 7 having the same number of dimensions as the individual three vectors. The number of dimensions of vector 7 is normally a power of 2, to take advantage of the fact that digital computers are binary devices.

The destination (driver) image 2 is fed into driver encoder 12, which comprises two independent encoders: pose encoder 5 and illumination encoder 6. Encoders 5 and 6 are each normally neural networks. As such, they each have an associated loss function, which is minimized in a training phase. In this case, the loss function for encoder 5 contains components representing the pose of image 2, and the loss function for encoder 6 contains components representing the illumination of image 2. As used herein, "pose" comprises both pose as that term is commonly used (e.g, where the head is looking in the case where image 2 is the image of a person's head) and expression (mouth open or closed, eyebrows raised or not raised, etc.). The outputs of encoders 5 and 6 are pose vector 8 and illumination vector 9, respectively. As with vector 7, vectors 8 and 9 each have multiple dimensions that are normally powers of 2.

Vectors 7, 8, and 9 are fed as inputs to neural network generator 10, which produces a composite image 3 consisting of identity information from source image 1 inserted into destination image 2. Composite image 3 desirably has substantially the same illumination as destination image 2. As with any neural network, generator 10 has an associated loss function. In this case, the loss function of generator 10 comprises identity, pose, and illumination components. Also, as with any neural network, generator 10 is trained before it is commissioned to work with real life (runtime) inputs. The objective of the training phase is to minimize the loss function. In the training phase, the coefficients (weights) of the identity, pose, and illumination components of the loss function are automatically adjusted so that generator 10 will provide acceptable outputs 3 during its runtime phase.

In one embodiment, generator 10 is a generative adversarial network. For that embodiment, multi-layered perceptron (MLP) neural network 11 is inserted in the path between vectors 7, 8 and 9 on the one hand, and generator 10 on the other hand.

FIG. 2 illustrates a method for implementing the first embodiment of the present invention. At step 24, just the identity information from source image 1 is encoded to produce identity vector 7 without any components representing illumination information from source image 1. At step 25, pose information from destination image 2 is encoded to produce pose vector 8. At step 26, illumination information from destination image 2 is encoded to produce illumination vector 9.

At step 20, neural network generator 20 is invoked to accept vectors 7, 8, and 9 as inputs, and to generate in response thereto composite image 3. Generator 20 is run (executed) in a training phase with training data before it is run in runtime mode using "real-life" input data.

Figure 3:
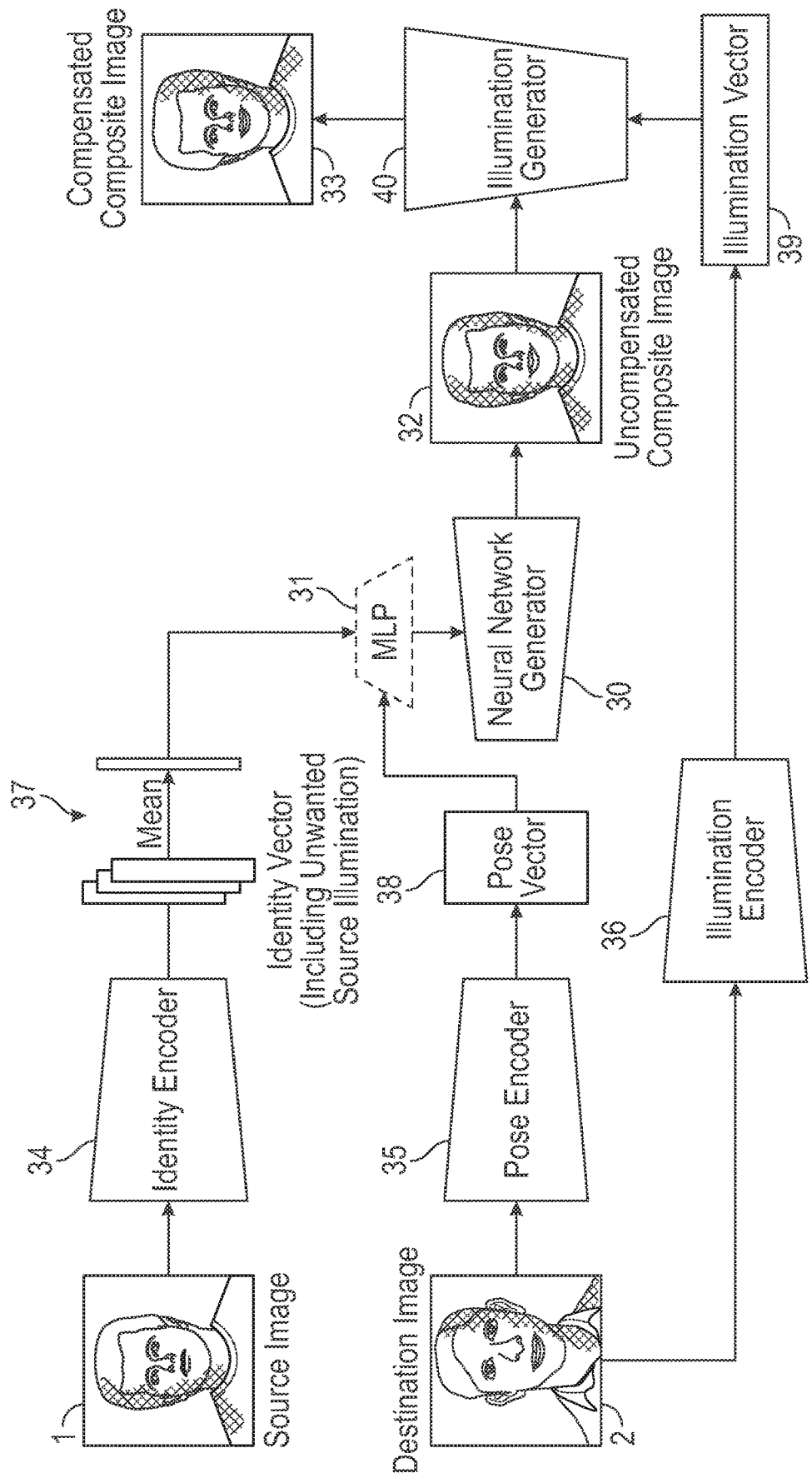
FIG. 3 is a block diagram illustrating a second embodiment of the present invention.
Figure 4:
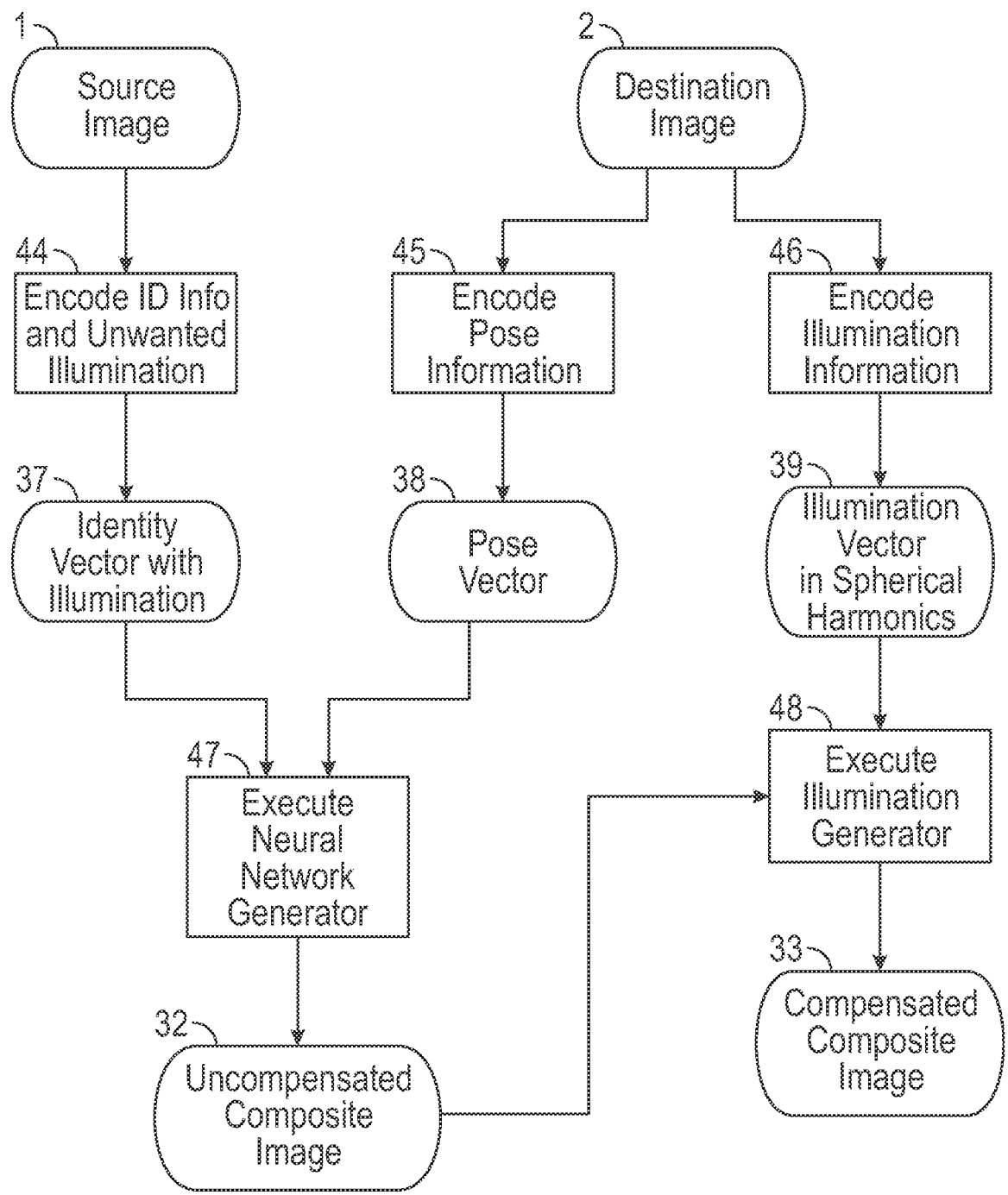
FIG. 4 is a flow diagram illustrating a method for implementing the FIG. 2 embodiment.

FIGS. 3 and 4 illustrate a second embodiment of the present invention. For purposes of illustration, source image 1 and destination image 2 are the same as in the first embodiment described previously. Identity encoder 34 may be the same as, or similar to, encoder 4, but with a difference. In this second embodiment, encoder 4 encodes illumination information from source image 1 as well as identity information (but not pose information). This illumination is considered to be unwanted, because the user wants the illumination from destination image 2, and not the illumination from source image 1, to render in the final compensated composite image 33.

Pose encoder 35 and illumination encoder 36 are the same as, or Similar to, encoders 5 and 6, respectively, but here again there is a difference in the second embodiment. Encoder 35 generates a pose vector 38, and illumination encoder 36 generates an illumination vector 39, as in the first embodiment. But in the second embodiment, illumination vector 39 is not fed as an input to the analogous neural network generator 30. Rather, in this second embodiment, the illumination compensation is performed after generator 30 does its work. As with pose encoder 5 and pose vector 8, "pose" in this second embodiment means "pose and expression".

Illumination vector 39 is typically, but not necessarily, represented in the form of spherical harmonics. In a preferred embodiment, there are nine parameters represented in vector 39.

In this second embodiment, neural network generator 30 produces a composite image 32 that has not been illumination-compensated. Composite image 32 and vector 39 are then fed as inputs to illumination generator 40, which produces the final compensated composite image 33, which is substantially similar to composite image 3 of the first embodiment.

Illumination generator 40 is typically a neural network and, as such, has an associated loss function, and is first trained on training data before being unleashed on "real-life" data. During the training phase, the loss function of generator 40 is minimized.

In one embodiment, neural network generator 30 is a generative adversarial network. In that embodiment, multilayered perceptron (MLP) neural network 31 is inserted between vectors 37 and 38 on the one hand, and generator 30 on the other hand.

In the first embodiment, items 4, 5, 6, 10, and optional item 11 are all preferably neural networks. In the second embodiment, items 34, 35, 36, 30, 40, and optional item 31 are all preferably neural networks. They all have loss functions, and they all are trained, in a preferred embodiment, neural networks 4, 5, 6, 34, 35, and 36 are variational auto encoders (VAE's). The loss function of each of the depicted neural networks is an algebraic function. A loss function may be thought of as the distance between the output of the neural network and the ground-truth value of its input.

Loss functions are problem specific. A human user of the system determines what components are to be in the loss function, and determines the initial weights for the respective components. The training phase of the associated neural network then adjusts the weights until the outputs of the neural network are acceptable to the user.

The loss function of neural network 10 has identity, pose, and illumination components. The loss function of neural network 30 has just identity and pose components.

The dimensions of vectors 7, 8, 9, 37, 38, 39 don't correspond to anything physical. A scalar value is associated with each dimension. If the number of dimensions is too great, the training phases of the neural networks that produce the vectors take an unacceptably long time. Also, the user reaches a point of diminishing returns, because the computers that execute the neural networks can't take advantage of all the extra dimensions. Rather, extra dimensions can lead to unwanted noise. Typically, illumination vector 9 has 64 dimensions. This relatively small number of dimensions is adequate, because a user is interested mainly in the direction of illumination, i.e., changes in illumination over time, and is not as interested in absolute values of illumination. The number of dimensions in pose vectors 8, 38 is typically 128. The number of dimensions in identity vectors 7, 37 is typically 256. This number is relatively large, to keep track of all the detailed biometric features of source 1, which is important for a successful outcome. A guided trial-and-error process is typically used to obtain the optimum number of dimensions of the various vectors for each particular implementation of the invention.

FIG. 4 illustrates a method for implementing the second embodiment. In step 44, identity information including illumination information (but not pose information) from source image 1 is encoded, resulting in an identity vector 37 that includes unwanted illumination information from image 1. In step 45, pose information from destination image 2 is encoded, producing pose vector 38. In step 46, illumination from destination image 2 is encoded, producing illumination vector 39, which is typically, but not necessarily, represented as a set of spherical harmonics.

At step 47, neural network generator 30 is called upon to accept as inputs vectors 37 and 38 and to produce, in response thereto, uncompensated composite image 32. Finally, at step 48, illumination generator 40 is called upon to accept as inputs illumination vector 39 and uncompensated composite image 32, and to produce in response thereto the final illumination-compensated composite image 33.

The following description illustrates one example of an important use to which the present invention can be put. In this example, the present invention is used to Implement item 230 of FIG. 6.

A system for automatic creation of a customized avatar animation of a user (also referred to herein as "system") may preliminarily create a multidimensional array of animated three-dimensional avatars (also referred to as avatar animations). Each blank avatar animation may correspond to one predetermined body size, such as small, medium, or large, a body length, and other body parameters. The plurality of animated three-dimensional avatars may be generated for each garment provided for selection through a website. Specifically, a garment may be represented in form of a three-dimensional animated garment worn by the animated three-dimensional avatar.

The user experience, can begin with a user taking at least two pictures of the user, such as a front view picture and a side view picture and providing the two pictures to the system. The system analyzes the two pictures received from the user to determine body dimensions of the user. In an example embodiment, the system provides 70 mm-accurate dimensions of the user. In other embodiments, the user enters his or her body dimensions, rather than being scanned. Upon determining the body dimensions of the user, the system selects two blank avatar animations that are the closest to the dimensions of the user, interpolates the selected blank avatar animations, and generates an interpolated avatar animation based on the body dimensions of the user. The interpolated avatar animation has dimensions of the avatar that correspond to the dimensions of the user. The system can use a machine learning technique to composite a face and hair of the user taken from the still images or videos of the user with the interpolated avatar animation and generate a customized avatar animation associated with the user. Therefore, the customized avatar animation generated by the system is a "digital double" of the user in the form of a three-dimensional (3D) avatar (3D model) generated based on the size and other parameters of the user. The user can then customize the digital double in real time with augmented reality (AR) tools, such as by adding makeup, changing hairstyle, adding a scene, and so forth.

The user can then select one or more garments for the 3D avatar to wear from their own closet, closet of an influencer, or from a clothing brand. The user can also resize the garment, select shoes, and select accessories. Furthermore, the user may select a scene (e.g., a background environment) in which the 3D avatar needs to be located. In exemplary embodiments, the scene may include a runway, private jet, yacht, party, club, and the like. In an example embodiment, the system may generate the customized avatar animation of the user in the form of a video, still photo, 3D object, or virtual reality (VR)/AR interactive scene and photorealistically render the customized avatar animation. A physics simulation may be run on the garment so that the garment may flow in a realistic manner as the avatar moves. The final customized avatar animation can then be streamed or downloaded to a user device.

Figure 5:
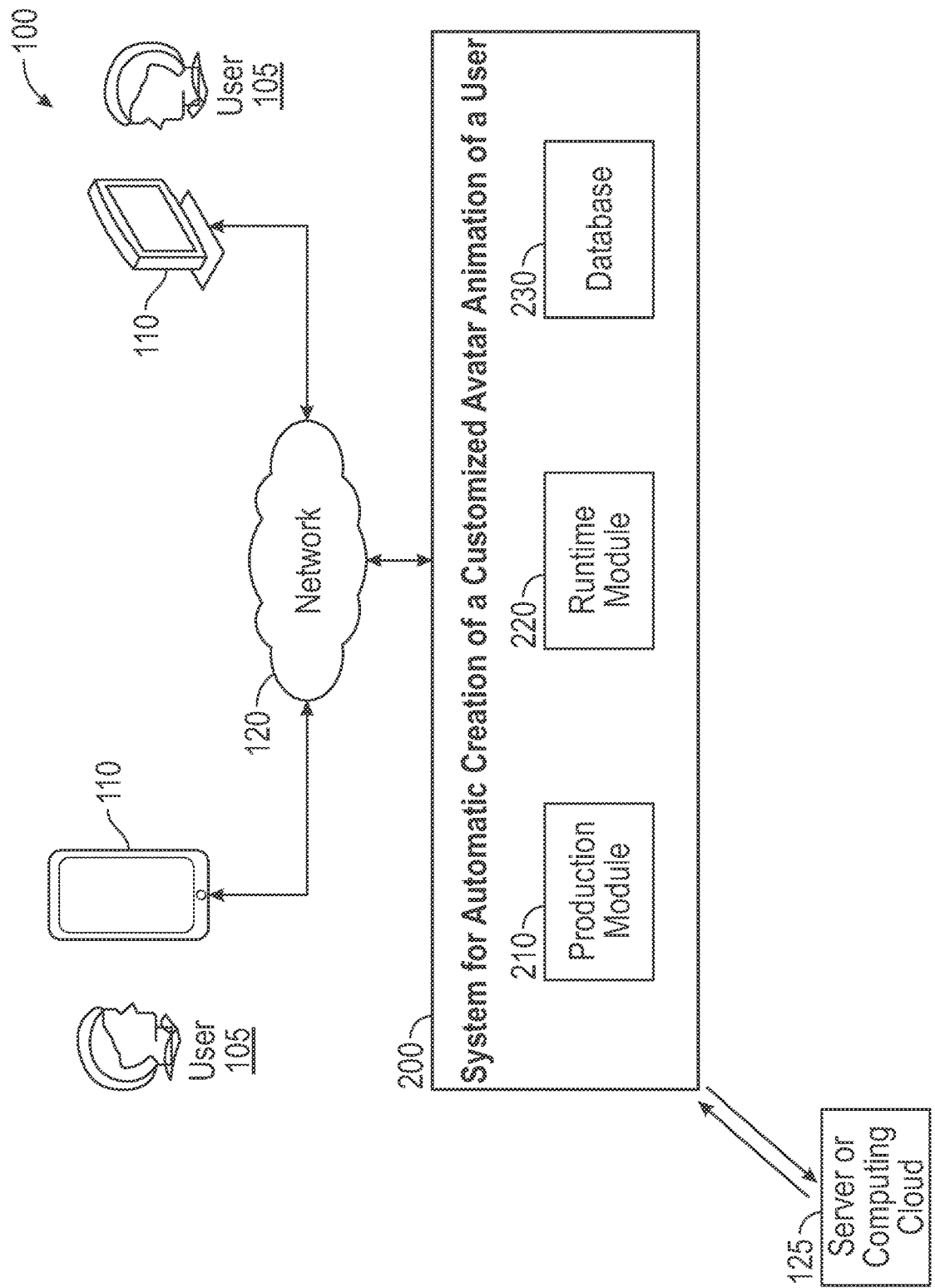
FIG. 5 is a block diagram of an environment in which systems and methods for automatic creation of a customized avatar animation of a user can be implemented, according to some example embodiments.

FIG. 5 shows an example environment 100, in which a system and a method for automatic creation of a customized avatar animation of a user can be implemented. The environment 100 may include one or more users 105, one or more personal computing devices also referred to as user devices 110 associated with the users 105, a network 120, a system 200 for automatic creation of a customized avatar animation of a user, and a server or computing cloud 125. The user devices 110 can refer to a mobile device such as a mobile phone, smartphone, or tablet computer. In further embodiments, the user devices 110 can refer to a personal computer, laptop computer, netbook, or any other computing device.

The user devices 110 can be communicatively connected to the system 200. The system 200 can be implemented as a cloud-based computing resource(s). The system 200 may be in communication with the server or computing cloud 125. The server or computing cloud 125 can include computing resources (hardware and software) available at a remote location and accessible over the data network 120. The server or computing cloud 125 can be communicatively coupled to the user devices 110 via the data network 120. The server or computing cloud 125 can be shared by multiple user(s) 105. In certain embodiments, the server or computing cloud 125 may include one or more server farms/clusters including a collection of computer servers that can be co-located with network switches and/or routers. The system 200 may include a production module 210, a runtime module 220, and a database 230.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), Wi-Fi™ network, and so forth.

Figure 6:
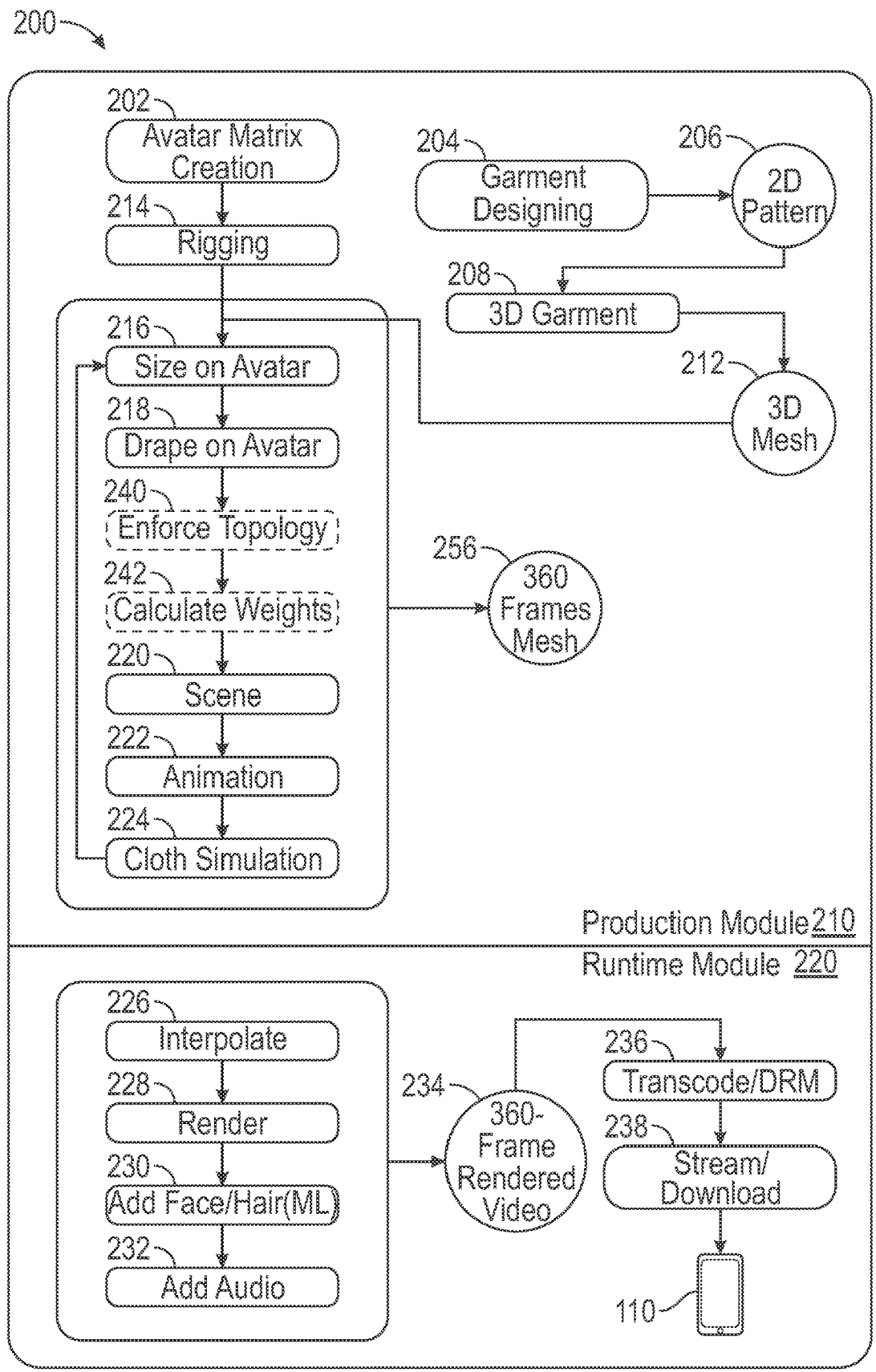
FIG. 6 depicts a workflow that may be utilized by a system for automatic creation of a customized avatar animation of a user, according to an example embodiment.

FIG. 6 depicts an exemplary workflow that can be utilized by modules of a system 200 for automatic creation of a customized avatar animation of a user, according to an example embodiment. Embodiments of the present disclosure provide for the customized computer animation to be generated by the system 200 in substantially real time or quasi-real time for thousands of users at a same time, with minimal to no human intervention. To produce the customized avatar animations, parts of the process can be conducted in advance in a production workflow by a production module 210 of the system 200, and other parts of the process may be conducted in real-time in a runtime workflow by a runtime module 220 of the system 200. The production module 210 and the runtime module 220 may also produce other digital assets, such as an AR/VR scene, 3D object, and still images/photos.

In the production workflow, the system 200 creates scenes, garments, and avatars. In the runtime workflow, the system 200 determines which pre-generated avatars are closest in shape and dimensions to the user, and interpolates the closest avatars based on multiple dimensions of the user to generate an avatar representing the user. Each of these workflows is discussed in further detail below.

Production workflow. The production module 210 may be configured to receive production parameters. The production parameters may include parameters for creating animated 3D avatars. Based on the production parameters, the production module may create a multidimensional array of a plurality of blank avatars. The multidimensional array is a matrix of pre-generated 3D avatars (3D models) as shown in block 202. Each blank avatar may have a predetermined number of frames and a plurality of features associated with each frame. In an example embodiment, the features may include a position of a body, position of body parts, color, lighting, presence of objects, tone, and so forth.

In exemplary embodiments, the multidimensional array is a matrix of 20 pre-generated avatars of different body shapes. Each of the pre-generated avatars may be provided with a garment proportionally sized based on body dimensions of the avatar. Garments may include clothes, accessories, shoes, and so forth, and may be provided by or associated with a seller, brand owner, advertiser, and so forth. The garments may be created by a garment designer as shown in block 204. Each garment may be first designed as a 2D pattern 206. Based on the 2D pattern 206, 3D garments 208 may be created. The 3D garments 208 may include 3D models of garments. Based on the 3D garments 208, a 3D mesh 212 of garments may be created. In exemplary embodiments, the 3D model of a garment that is input into the system 200 is based on a 3D computer-aided design (CAD) design of the garment. In other embodiments, the 3D model of a garment is derived from photogrammetry techniques.

The avatars may be pre-generated for each garment. While in one embodiment, 20 avatars are used, there can be fewer or more avatars in other embodiments, in a matrix of n×m size, where n is the number of avatar sizes and m is the number of garments. The output of the production phase is a set of X frames (e.g., 360 frames) of animated avatars with draped and properly sized physics simulated garments. At runtime, the interpolation engine interpolates between all frames of the animation.

Figure 7:
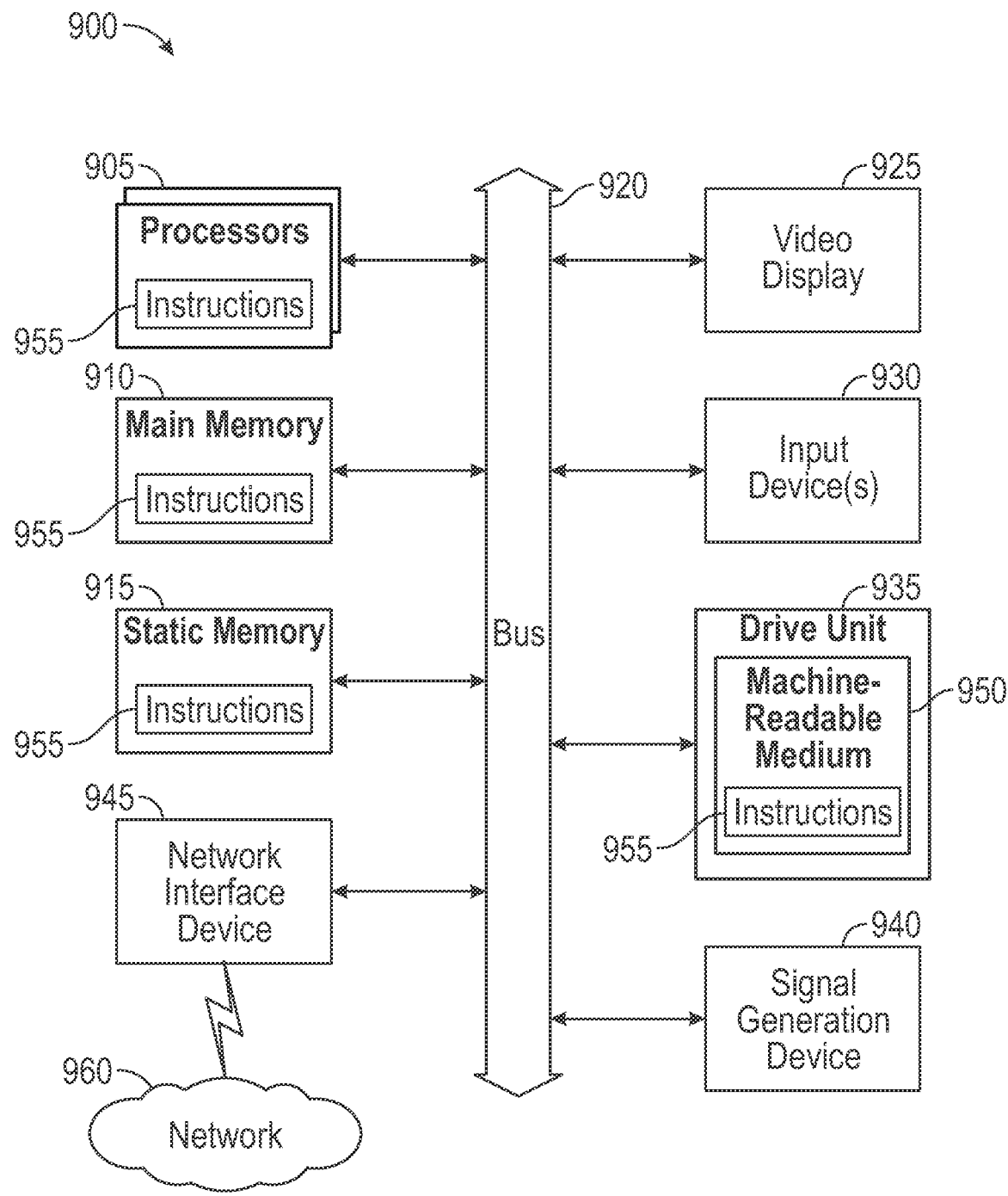
FIG. 7 is a diagrammatic representation of an example machine in the form of a computer system within which a set of instructions for the machine to perform any one or more of the methods discussed herein is executed.

FIG. 7 shows a diagrammatic representation of a computing device or a machine in, for example, the electronic form of a computer system 900, within which a set of instructions for causing the machine to perform any one or more of the methodologies discussed herein can be executed. In some embodiments, the machine operates as a standalone device, while in other embodiments it can be connected (e.g., networked) to other machines. In a networked deployment, the machine can operate in the capacity of a server, a client machine in a server-client network environment, or as a peer machine in a peer-to-peer (or distributed) network environment. The machine can be or comprise a personal computer (PC), tablet PC, cellular telephone, web appliance, network router, switch, bridge, or any machine capable of executing a set of instructions (sequential or otherwise) that specify actions to be taken by that machine. Further, while only a single machine is illustrated, the term "machine" shad also be taken to include any collection of machines that separately or jointly execute a set (or multiple sets) of instructions to perform any one or more of the methods discussed herein.

In an illustrative embodiment, the computer system 900 comprises at least one processor 905 (e.g., a central processing unit, a GPU, and so on, singly or in combination), and a memory, which in this example comprises a main memory 910 and a static memory 915. The computer system 900 may further comprise a video display 925, a signal generation device 940 (e.g., a speaker), and a network interface device 945. In addition, the computer system 900 may comprise at least one input device 930, such as an alphanumeric input device (e.g., a keyboard), a cursor control device (e.g., a mouse), a microphone, a digital camera, and so forth. Communication among the components may be accomplished via a bus 920. Computer system 900 can be implemented in a variety of ways—for example, a speech processing system can be used to input the user's dimensions; and a holographic display, HD television monitor, or billboard display can be used in lieu of or in addition to video display unit 925.

A drive unit 935 includes a computer-readable medium 950, which stores one or more sets of instructions 955 and data embodying or utilized by any one or more of the methods or functions described herein. The instructions 955 can also reside, completely or at least partially, within the main memory 910 and/or within the processors 905 during execution thereof by the computer system 900. The main memory 910 and the processors 905 also constitute machine-readable media. All the modules of the present invention can be embodied in an embedded system in an FPGA or SOC (system on a chip), with everything embedded in a single processor.

The instructions 955 can further be transmitted or received over a communications network 960 via the network interface device 945 utilizing any one of a number of well-known transfer protocols (e.g., Hyper Text Transfer Protocol (HTTP), Controller Area Network, Serial, and Modbus). The communications network 960 may Include the Internet, local intranet, PAN, LAN, WAN, Metropolitan Area Network, VPN, a cellular network, Bluetooth radio, or an IEEE 802.9-based radio frequency network, and the like.

While the computer-readable medium 950 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shah also be taken to include any medium that is capable of storing, encoding, or carrying a set of instructions for execution by the machine and that causes the machine to perform any one or more of the methods of the present application, or that is capable of storing, encoding, or carrying data utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory, read only memory, and the like.

The example embodiments described herein can be implemented in an operating environment comprising computer-executable instructions installed on a computer, in software, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written utilizing any number of suitable programming languages such as, for example, HyperText Markup Language (HTML), Dynamic HTML, Extensible Markup Language, Extensible Stylesheet Language, Document Style Semantics and Specification Language, Cascading Style Sheets, Synchronized Multimedia integration Language, Wireless Markup Language, Java™, Jini™,C, C++, C#, Go, .NET, Adobe Flash, Pert, UNIX Shell, Visual Basic or Visual Basic Script, Virtual Reality Markup Language, ColdFusion™ Objective-C, Scala, Clojure, Python, JavaScript, HTML5 or other compilers, assemblers, interpreters, or other computer languages or platforms, as one of ordinary skill in the art will recognize.

The above description is included to illustrate the operation of preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. Apparatus for inserting identity information from a source image into a destination image while mimicking illumination of the destination image, said apparatus comprising:
    an identity encoder configured to encode just identity information of the source image and to produce an identity vector, where the identity encoder does not encode any pose information or illumination information of the source image;
    a pose encoder configured to encode pose information from the totality of the destination image and to produce a pose vector;
    separate from and independent of the pose encoder, an illumination encoder configured to encode illumination information from the totality of the destination image and to produce an illumination vector; and
    a neural network generator coupled to the identity encoder, pose encoder, and illumination encoder, and having three inputs: the identity vector, the pose vector, and the illumination vector; wherein
    the generator is configured to generate, in response to the three inputs, a composite image comprising identity information of the source image inserted into the destination image, wherein the composite image has substantially the same illumination as the destination image.

2. The apparatus of claim 1 wherein the neural network generator has an associated loss function comprising identity, pose, and illumination components.

3. The apparatus of claim 2 wherein the neural network generator has an associated training phase whose objective is to minimize the loss function.

4. The apparatus of claim 1 wherein the source image and the destination image are static images.

5. The apparatus of claim 1 wherein the source image and the destination image are video images.

6. The apparatus of claim 5 wherein the encoded identity information of the source image comprises the gait of the source.

7. The apparatus of claim 1 wherein the encoded identity information of the source image comprises facial features of the source.

8. The apparatus of claim 1 wherein the encoded identity information of the source image comprises hair features of the source.

9. The apparatus of claim 1 wherein the encoded identity information of the source image comprises torso features of the source.

10. The apparatus of claim 1 wherein the identity encoder, pose encoder, and illumination encoder are neural networks.

11. The apparatus of claim 1 wherein:
    the neural network generator is a generative adversarial network; and
    a multi-layered perceptron neural network is positioned between the three encoders and the neural network generator.

12. Apparatus for inserting identity information from a source image into a destination image while mimicking illumination of the destination image, said apparatus comprising:
    an identity encoder configured to encode identity information of the source image and to produce an identity vector, where the identity encoder does not encode any pose information, and the identity information includes uncompensated illumination information of the source image;

a pose encoder configured to encode just pose information from the totality of the destination image and to produce a pose vector, where the pose encoder does not encode any illumination information of the destination image;

separate from and independent of the pose encoder, an illumination encoder configured to encode just illumination information from the totality of the destination image and to produce an illumination vector;

a primary neural network generator having two inputs, the identity vector and the pose vector, and an uncompensated composite image output; and an illumination generator having two inputs, the uncompensated composite image output from the primary generator and the illumination vector; wherein the illumination generator is a neural network optimized to produce an output composite image comprising identity information of the source image inserted into the destination image, wherein the composite image has substantially the same illumination as the destination image.

13. The apparatus of claim 12 wherein the illumination vector is represented as a set of spherical harmonics.

14. The apparatus of claim 12 wherein:
the primary neural network generator is a generative adversarial network; and
the identity vector and the pose vector are fed to the primary neural network generator via a multi-layered perceptron neural network.

15. A method for inserting identity information from a source image into a destination image while mimicking illumination of the destination image, said method comprising the steps of:
encoding identity information of the source image to produce an identity vector, where the identity information encoding does not encode any pose information or illumination information of the source image;
encoding pose information from the totality of the destination image to produce a pose vector;
separately from and independently of the pose information encoding step, encoding illumination information from the totality of the destination image to produce an illumination vector; and
activating a neural network generator to accept as inputs the identity vector, the pose vector, and the illumination vector; and to generate in response thereto a composite image comprising identity information of the source image inserted into the destination image, wherein the composite image has substantially the same illumination as the destination image.

16. The method of claim 15 further comprising the step of training the neural network generator to minimize a loss function.

17. The method of claim 16 wherein the loss function takes into account identity information of the source image, and pose and illumination information of the destination image.

18. A method for inserting identity information from a source image into a destination image while mimicking illumination of the destination image, said method comprising the steps of:
encoding identity information of the source image to produce an identity vector, where the identity information encoding does not encode any pose information, and the identity information encoding does encode unwanted illumination of the source image;
encoding pose information from the totality of the destination image to produce a pose vector;
separately from and independently of the pose information encoding step, encoding illumination information from the totality of the destination image to produce an illumination vector;
activating a neural network generator to accept as inputs the identity vector and the pose vector, and to generate in response thereto a composite image comprising identity information of the source image inserted into the destination image, wherein the composite image contains uncompensated illumination information of the source image; and
activating an illumination generator to accept as inputs the uncompensated composite image and the illumination vector, and to generate in response thereto a compensated composite image comprising identity information of the source image inserted into the destination image, wherein the compensated composite image has substantially the same illumination as the destination image.

19. The method of claim 18 wherein the illumination vector is represented as a set of spherical harmonics.

20. The method of claim 18 wherein:
the neural network generator is a generative adversarial network; and
a multi-layered perceptron neural network is positioned between the identity vector and the pose vector on the one hand, and the neural network generator on the other hand.

21. At least one computer-readable medium for executing computer-readable instructions configured to insert identity information from a source image into a destination image while mimicking illumination of the destination image, said instructions performing the steps of:
encoding identity information of the source image to produce an identity vector, where the identity information encoding does not encode any pose information or illumination information of the source image;
encoding pose information from the totality of the destination image to produce a pose vector;
separately from and independently of the pose information encoding step, encoding illumination information from the totality of the destination image to produce an illumination vector; and
activating a neural network generator to accept as inputs the identity vector, the pose vector, and the illumination vector; and to generate in response thereto a composite image comprising identity information of the source image inserted into the destination image, wherein the composite image has substantially the same illumination as the destination image.

22. At least one computer-readable medium for executing computer-readable instructions configured to insert identity information from a source image into a destination image while mimicking illumination of the destination image, said instructions performing the steps of:
encoding identity information of the source image to produce an identity vector, where the identity information encoding does not encode any pose information, and the identity information encoding does encode unwanted illumination of the source image;
encoding pose information from the totality of the destination image to produce a pose vector;

separately from and independently of the pose information encoding step, encoding illumination information from the totality of the destination image to produce an illumination vector;

activating a neural network generator to accept as inputs the identity vector and the pose vector, and to generate in response thereto a composite image comprising identity information of the source image inserted into the destination image, wherein the composite image contains uncompensated illumination information of the source image; and activating an illumination generator to accept as inputs the uncompensated composite image and the illumination vector, and to generate in response thereto a compensated composite image comprising identity information of the source image inserted into the destination image, wherein the compensated composite image has substantially the same illumination as the destination image.

* * * * *